(12) United States Patent
Kováč

(10) Patent No.: US 12,032,695 B2
(45) Date of Patent: Jul. 9, 2024

(54) REDUCING MALWARE SIGNATURE REDUNDANCY

(71) Applicant: Avast Software s.r.o., Prague (CZ)

(72) Inventor: Peter Kováč, Prague (CZ)

(73) Assignee: Avast Software s.r.o., Prague (CZ)

( * ) Notice: Subject to any disclaimer, the term of this patent is extended or adjusted under 35 U.S.C. 154(b) by 121 days.

(21) Appl. No.: 17/495,185

(22) Filed: Oct. 6, 2021

(65) Prior Publication Data
US 2023/0107209 A1    Apr. 6, 2023

(51) Int. Cl.
G06F 21/00    (2013.01)
G06F 21/55    (2013.01)
G06F 21/56    (2013.01)

(52) U.S. Cl.
CPC .......... *G06F 21/566* (2013.01); *G06F 21/554* (2013.01); *G06F 21/564* (2013.01); *G06F 21/568* (2013.01)

(58) Field of Classification Search
CPC .... G06F 21/568; G06F 21/564; G06F 21/554; G06F 21/566
USPC .......................................................... 726/22
See application file for complete search history.

(56) References Cited

U.S. PATENT DOCUMENTS

| | | | | |
|---|---|---|---|---|
| 8,171,063 B1* | 5/2012 | Janakiraman | ....... | G06F 16/1752 707/791 |
| 11,005,860 B1* | 5/2021 | Glyer | ................. | H04L 63/1433 |
| 2014/0181975 A1* | 6/2014 | Spernow | ............... | G06F 21/568 726/23 |
| 2015/0154398 A1* | 6/2015 | Jones | .................... | G06F 21/561 726/24 |
| 2016/0330219 A1* | 11/2016 | Hasan | ................... | G01C 21/387 |
| 2021/0374153 A1* | 12/2021 | Saxena | ................ | G06F 16/358 |
| 2022/0292196 A1* | 9/2022 | Bhagi | .................... | G06N 20/00 |

OTHER PUBLICATIONS

Cormode, et al. "Set Cover Algorithms For Very Large Datasets" CIKM '10, Oct. 26-30, 2010, Toronto, Ontario, Canada.

* cited by examiner

*Primary Examiner* — Josnel Jeudy
(74) *Attorney, Agent, or Firm* — AVEK IP, LLC; Mark C. Young; William B. Kircher

(57) ABSTRACT

Redundancy in a malware signature list is reduced by processing a plurality of pairs of records in a known malware signature list, where each pair of records comprises a file identifier and an associated malware detection. At least one of the file identifiers and the associated malware detections are mapped to symbols representing the file identifiers and the associated malware detections, the symbols taking less memory than the file identifiers and the associated malware detections. The mapped symbols representing the file identifiers and the associated malware detections are processed to remove at least some malware detections that are not needed to provide a desired degree of representation of each file identifier in the processed known malware signature list, and a processed known malware signature list is stored.

18 Claims, 4 Drawing Sheets

REDUCING MALWARE SIGNATURE REDUNDANCY

FIELD

The invention relates generally to security in computerized systems, and more specifically to reducing malware signature redundancy in a set of malware signatures.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, web site scanning tools are used to verify the security and integrity of a website, and to identify and fix potential vulnerabilities.

For example, antivirus software installed on a personal computer or in a firewall may use characteristics of known malicious data to look for other potentially malicious data, and block it. In a personal computer, the user is typically notified of the potential threat, and given the option to delete the file or allow the file to be accessed normally. A firewall similarly inspects network traffic that passes through it, permitting passage of desirable network traffic while blocking undesired network traffic based on a set of rules. Tools such as these rely upon knowledge of prior detected malware to identify malware on an end user's computer system, and prevent the malware from causing damage. This knowledge of prior detected malware often takes the form of a data set of known signatures of files infected with malware, and a description of the malware associated with each signature. Employing methods such as this enables accurate and robust ability to detect potential threats, and provides for protection against newly-discovered malware by simply adding new malware signatures to the data set of known malware.

But, maintaining a large data set of known malware can result in redundant signatures, increasing the size of the malware database, making scanning for malware function more slowly, and reducing the size of periodic updates. It is therefore desirable to manage malware signature redundancy in a malware signature set.

SUMMARY

One example embodiment of the invention comprises a method of reducing redundancy in a malware signature list by processing a plurality of pairs of records in a known malware signature list, where each pair of records comprises a file identifier and an associated malware detection. At least one of the file identifiers and the associated malware detections are mapped to symbols representing the file identifiers and the associated malware detections, the symbols taking less memory than the file identifiers and the associated malware detections. The mapped symbols representing the file identifiers and the associated malware detections are processed to remove at least some malware detections that are not needed to provide a desired degree of representation of each file identifier in the processed known malware signature list, and a processed known malware signature list is stored.

In a further example, the desired degree of representation is that one of a plurality of detections covering a file should be retained as selected by an algorithm. In another example, the desired degree of representation of each file identifier is that each file be represented by at least a configurable number of malware detections before additional malware detections covering the file are removed. In an alternate example, the desired degree of representation of each file identifier comprises not removing detections that cover more than a threshold number of unique files.

The details of one or more examples of the invention are set forth in the accompanying drawings and the description below. Other features and advantages will be apparent from the description and drawings, and from the claims.

DETAILED DESCRIPTION

Figure 1:
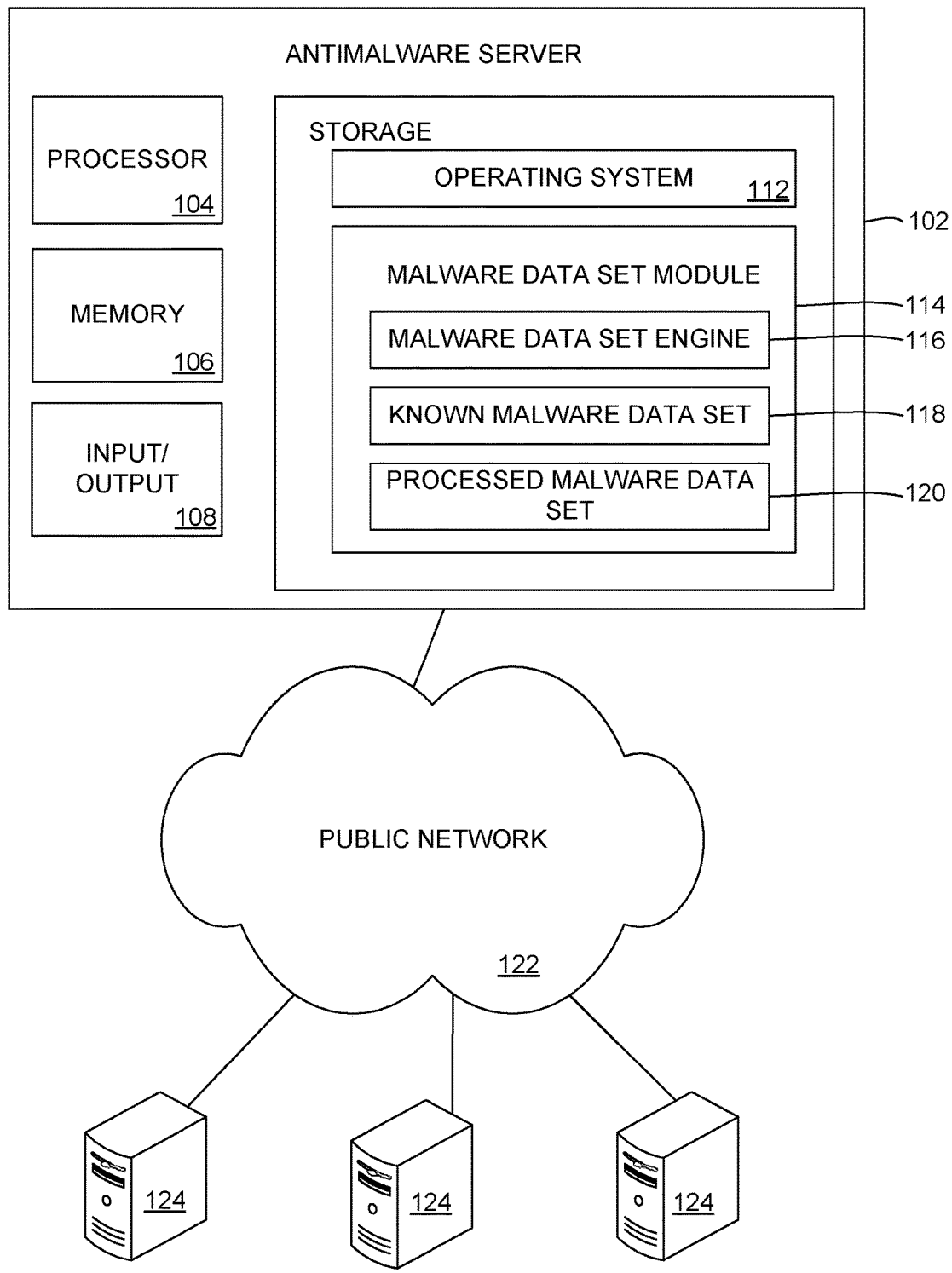
FIG. 1 shows an antimalware system, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java™ applets, and other such common files are all frequently infected with malware of various types, and users rely on tools such as antivirus software or other malware protection tools to protect their computerized devices from harm.

In a typical home computer or corporate environment, firewalls inspect and restrict the types of communication that can occur between local devices such as computers or IoT devices and the Internet, antivirus programs prevent known malicious files from being loaded or executed on a computer system, and malware detection programs detect known malicious code such as remailers, keystroke loggers, and other software that is designed to perform undesired operations such as stealing information from a computer or using the computer for unintended purposes. But, with new threats constantly emerging, efficient and timely detection of vulnerabilities within computerized systems and IoT devices such as a home appliance remain a significant challenge. New anti-malware signatures, artificial intelligence networks or systems, and other such solutions are therefore constantly under development.

Anti-malware signatures are typically stored in a database, including a hash of previously-identified files encrypted with malware (such as a SHA-256 hash of the infected file), and a description of the type of malware detected if a file having a matching hash is found. These hashes and associated descriptions are stored in a database that can be compared against a user's hashed files during a malware scan, enabling the anti-malware tool to identify and quarantine infected files. But, as the number of known threats grows increasingly larger, the probability of duplicate malware entries in the known malware data set or sets becomes increasingly higher. A larger known malware data set results in slower malware scans as the signatures that each file are compared against grow, and results in slower updates and more network traffic as redundant malware signatures are needlessly sent via network.

Unfortunately, the challenge of ensuring complete data set coverage of known malware while reducing or eliminating redundancies in the known malware signature set is computationally very difficult and time-consuming, as traditional methods such as comparing each data set entry to each other entry to reduce redundancies can take an extremely long time as the data set grows to hundreds of megabytes or more of data.

Some examples described herein therefore seek to reduce redundancy among malware signature entries in a known malware signature data set in a computationally efficient way, substantially reducing the amount of time spent comparing redundant malware signatures against files during malware scans and downloading redundant malware signatures during database updates. In one such example, the file identifiers or hashes and the associated malware identification or detections are replaced with a mapping that takes less data, such as an ordered number, and stored to nonvolatile storage if temporary storage is constrained. The processed or mapped data can then be more efficiently processed in memory or volatile storage, ensuring the desired degree of coverage of known malicious files is provided by the resulting known malware data set.

FIG. 1 shows an antimalware system, consistent with an example embodiment. Here, a network device such as antimalware server 102 comprises a processor 104, memory 106, input/output elements 108, and storage 110. Storage 110 includes an operating system 112, and a malware data set module 114 that is operable to maintain a data set of known malware as may be used by antivirus/antimalware software to detect malicious files in end user computer systems. The malware data set module 114 further comprises malware data set engine 116, which is operable to perform functions such as assembling or maintaining a known malware data set 118, and assembling and maintaining update files for distribution to end users such as processed malware data set 120. The malware data set 118 comprises in this example a data set of known malware signatures, such as hashes of files previously encountered and known to be infected, as well as associated data indicating the type of malware or detection associated with each stored hash. In a further example, the processed malware data set comprises select entries from the known malware data set, chosen to ensure adequate coverage of known infected files and malware types while limiting unnecessary redundant entries.

The antimalware server 102 is connected to a public network 120 such as the Internet, which facilitates communication with other computer systems such as to distribute antimalware software and signature data sets via public network 122 to end user computers 124, and to receive reports of suspected or detected malware from the end user computers 124. In other examples, some or all features of the system of FIG. 1 are distributed among multiple computers, or are omitted from the system and/or performed by other parties, such as maintaining the malware data set 118 and/or processed malware data set 120 on a separate server from antimalware server 102.

In operation, various collections of known malware are assembled into known malware set 118 on the antimalware server 102, which include in various embodiments malware signatures from different resources, different means of detection or characterization, and that are stored in different files or groupings. This collective grouping of known malware is processed by the malware data set engine to create a processed malware data set 120 for use in detecting malware, such as by distributing it with antimalware software to end user computers 124. In some further examples, the malware data set engine 116 also evaluates the known malware data set for issues such as redundant or overlapping malware data set entries, and for detected changes since various revisions or versions of a known malware signature data set for the creation and distribution of updates to the end user computers 124.

Redundant or overlapping entries in the known malware data set 118 can cause the known malware data set to become unnecessarily large, especially when the known malware data set is constructed from log files or collections of databases from different sources. The size of a known malware data set distributed with anti-malware software can similarly grow excessively large, and updates can include redundant malware signatures that can be removed to save user storage space and network capacity. But, because the total size of known malware data available at 118 can consume gigabytes or even terabytes of data, it is computationally quite expensive to check each malware signature against each other malware signature in the data set for redundancy in generating processed malware data set 120.

The malware data set engine 116 in some examples therefore employs a method of reducing redundancy in a computationally efficient way, using a data processing step and a set coverage step that employs data produced during the data processing step to ensure adequate coverage of each file and malware type or detection associated with the file. In a more detailed example, the known malware data set comprises pairs of file hashes or other identifiers to identify files known to be malicious or infected with malware, and detections or descriptions of the type of malware known to be in the malicious file. The file identifiers and detections for each entry are mapped to a shorter value, such as sequential counting numbers, and are written back to hard disk or other nonvolatile storage as a mapped data partition if memory or temporary storage fills up while processing the known malware data set.

For large known malware data sets, this can result in several mapped data partitions, each of which is substantially smaller than the original known malware data set section it represents. Because the mapped data partitions are substantially smaller than the original known malware data set, they can be more easily stored in memory for processing than the large data set of known malware. The malware set coverage process then evaluates the mapped data partitions stored in memory for file and detection representations, employing a process that ensures a desired degree of coverage is achieved, such as a file having multiple detections or known types of malware being represented in the processed data set by more than one record (limited by a maximum file redundancy value R). In an alternate embodiment, each file need only be present with one detection or known type of malware to be detected and flagged as malicious, and so the number of redundant detections stored "R" is one. The resulting processed malware data set 120 can then be distributed to end user computers 124, such as with an original malware software installation or as an update to a previous processed malware data set.

Figure 2:
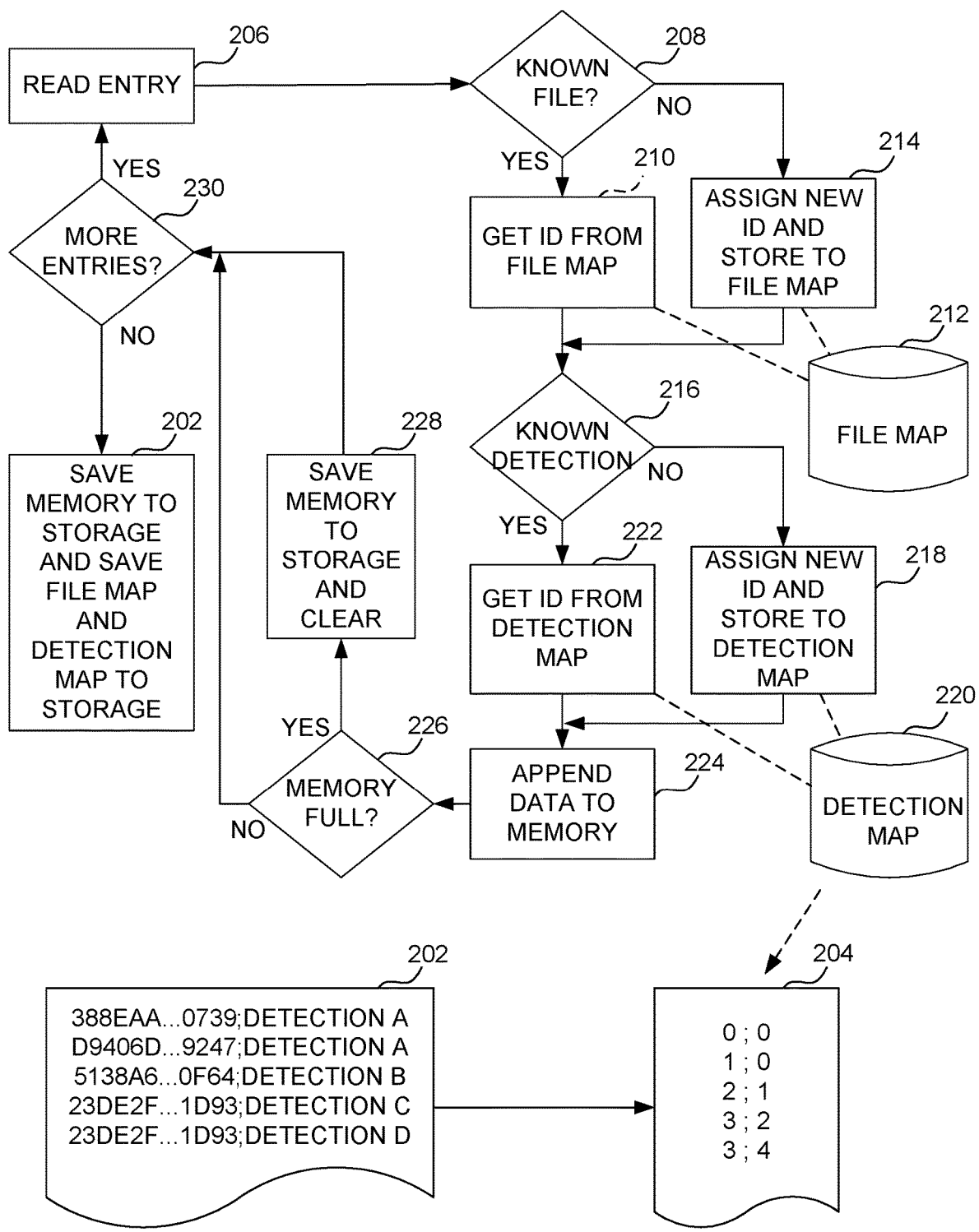
FIG. 2 is a flowchart showing mapping the known malware data set, consistent with an example embodiment.

FIG. 2 is a flowchart showing mapping the known malware data set, consistent with an example embodiment. Here, a known malware data set 202 is processed to generate a mapped data set 204, which represents the same unique information as the known malware data set 202 but without the 256-bit SHA256 hash representing the file and the long text description representing the detection or known malware type as shown at 202. The mapped data set 204 shows mapping to sequential counting numbers, which can be processed in subsequent steps using a small fraction of the memory of the full-length 256-bit (or 64-byte) file hashes and text detection descriptions.

At 206, an entry is read, which in this example comprises reading the first line of a known malware file such as is shown at 202. If the hash is a known file that has been seen before in the process at 208, the associated file ID is retrieved at 210 from file map 212. If it is not a known file, a new ID is assigned at 214, and is stored in file map 212. Here, the first file hash starting 388EAA has not yet been seen, as it is the first record being processed, so a new file ID of "0" is assigned and stored in the file map.

Similarly, the detection for the malware file entry is read at 216, and because it too is unknown as it is the first malware file entry being read, it is assigned a new detection ID at 218 and stored in the detection map 220. If it were a subsequent known malware record with a known detection, the detection ID would be retrieved from the detection map 220 at 222.

The mapped file and detection data is appended to records stored in memory or volatile storage at 224, and a determination as to whether the memory has become full (e.g. has reached a threshold limit for available memory remaining) is made at 226. If the memory is full, the memory is saved to nonvolatile storage such as hard disk at 228, and the memory records of mapped files and detections is cleared. If the memory is not full, the process proceeds without clearing the memory, to determining whether there are more entries at 230, repeating the process for each record in the known malware files being processed. Once the last entry has been read and processed, the memory is saved to storage, finalizing the file map 212 and detection map 220.

In the example of FIG. 2, five records are processed as shown at 202—the first two records having the same detection, and the last two records having the same file hash. This is reflected in the processed known malware file 204, which shows that the first two records share detection "0," and the last two records share file hash "3." This processed or mapped known malware file as shown at 204 is used in the next step to remove unwanted redundancies in the known malware data set, producing the processed malware data set 120 of FIG. 1.

Figure 3:
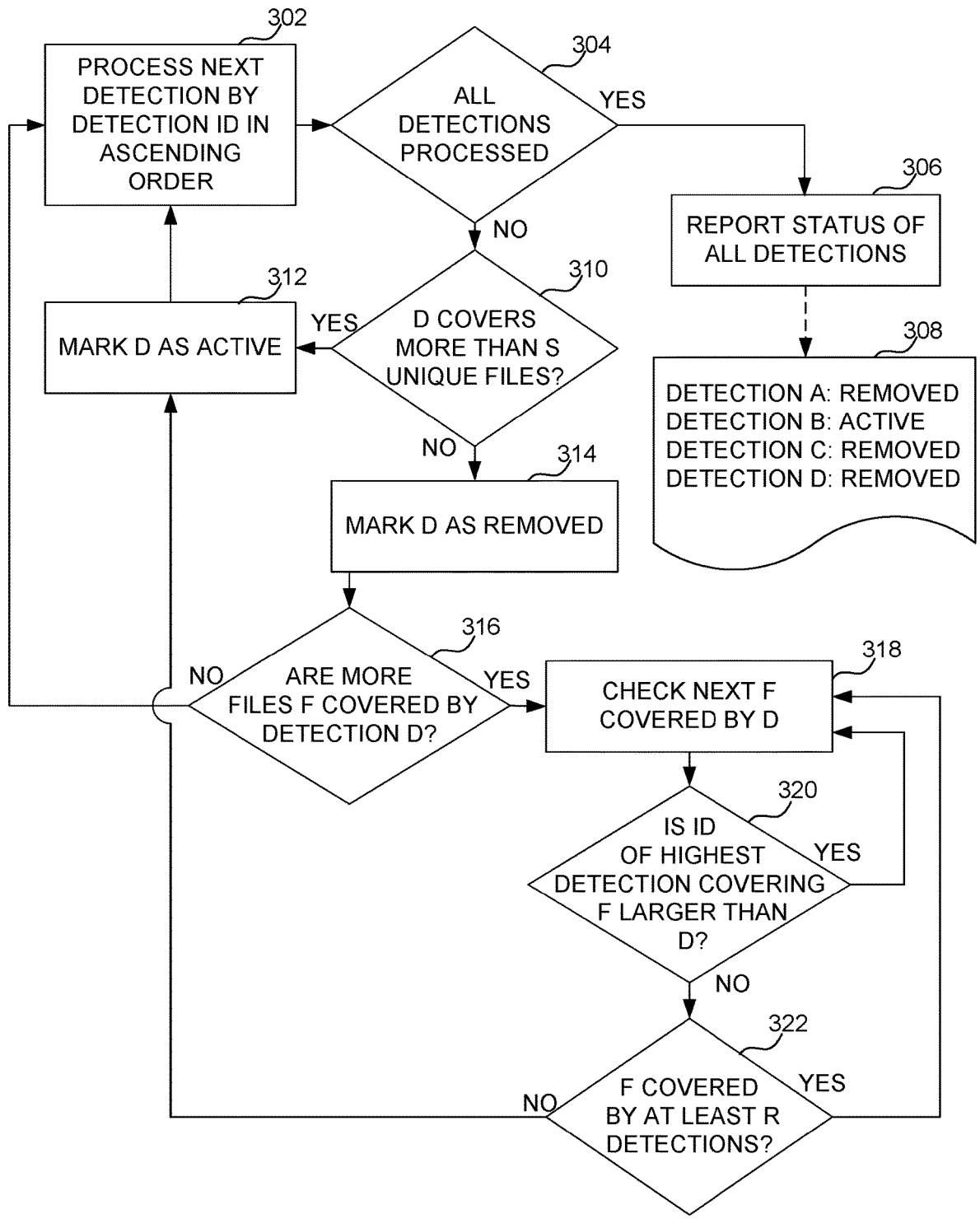
FIG. 3 is a flowchart showing data set coverage processing of the mapped known malware data set, consistent with an example embodiment.

FIG. 3 is a flowchart showing data set coverage processing of the mapped known malware data set, consistent with an example embodiment. Here, the mapped known malware data set 204 from FIG. 2 is processed to remove undesired redundancies in file and/or detection coverage. As reflected at 302, the process stars by processing detections by detection ID in ascending order until all detections are processed at 304, at which time the status of each detection is reported at 306 and/or stored as shown at 308. By removing detections that are redundant from the original known malware data set, the known malware data set's size can be reduced significantly and the storage, network transmission, and update costs associated with managing a needlessly large data set can be reduced.

If all detections are not yet processed at 304, as is the case when processing the five example records of mapped known malware data set 204 of FIG. 2, the process of FIG. 3 proceeds to 310. At 310, the set coverage process determines whether the detection D covers more than a threshold number S of unique files. If the detection is present in a sufficiently large number of files, the detection will automatically be marked as active at 312, irrespective of other factors. In alternate embodiments, this step 310 is omitted, and the process proceeds to step 314, where detection D is marked as removed (as a default determination that can be changed by the following steps). At 316, the process determines whether there are files F covered by detection D that have not been checked, and if so proceeds to check the next file F covered by detection D at 318. If there are no more files F covered by detection D to be considered, the process returns to 302 and evaluates the next detection D.

If there are there are files F covered by detection D that have not been checked at 316 and the next file is checked at 318, the process proceeds to 320 where the next file F covered by detection D is evaluated by determining if the ID of the highest detection covering file F is larger than the detection number D of the detection being currently evaluated. If the ID of the highest detection covering the file being checked is higher than the ID of the current detection, the current detection is not needed to cover that file as it is covered by another detection with a higher number, and the next file F covered by the detection D is checked at 318. If the ID of the highest detection covering file F is not larger than the detection number D at 320, the process determines whether the file F is covered by at least a threshold number R of detections, and if not, marks the detection as active at 312 before proceeding to the next detection. If the file F is covered by at least R detections already, additional detections are deemed not necessary to ensure adequate coverage of that detection/file, and the next file F covered by the detection D is checked at 318.

The result of this process of FIG. 3 is that for each detection processed, the detection is marked as active if it covers more than a threshold of unique files (e.g. step 310), is marked as active if it is the highest numbered detection covering a specific file covered by the detection (e.g., steps 318-320), and is marked active if a file covered by the detection is not covered by at least a threshold R number of detections (e.g., step 320). Detections not meeting at least one of these criteria can be marked as removed, as they provide redundant or unneeded coverage of a file, as reflected in the processed detections record 308.

The examples presented here illustrate how using symbols to represent files and detections (or malware signatures/types) enables more efficient processing of malware signature data records using less memory, and how such processing can determine whether a malware signature is needed to ensure desired coverage of a set of known malicious files that are part of a known malware data set. By reducing redundant malware signatures or detections, the amount of data transmitted as part of a malware file signature set or update is reduced, and the amount of work done in searching for malware on end user systems is also reduced.

Figure 4:
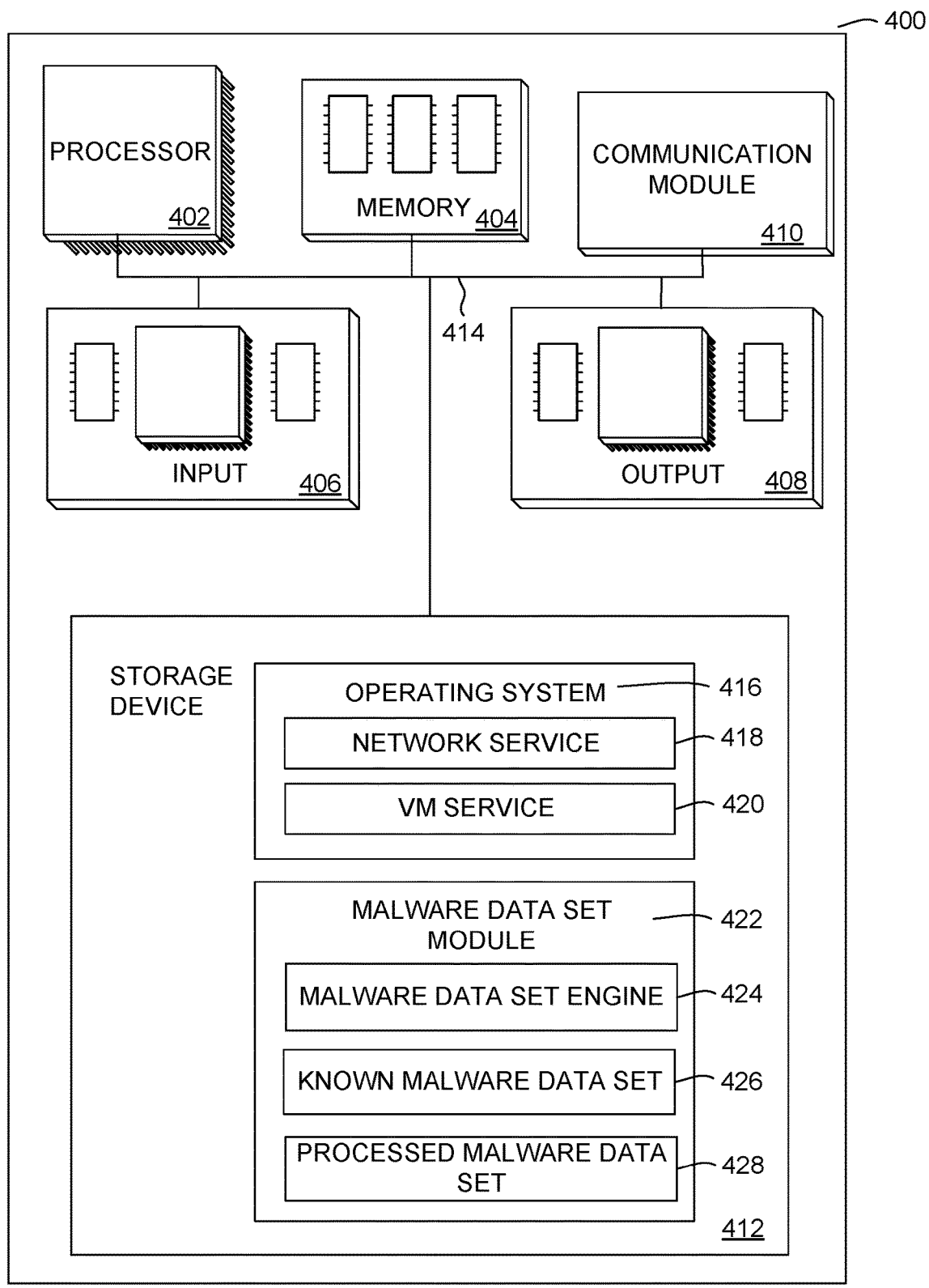
FIG. 4 is a computerized antimalware server system, consistent with an example embodiment.

In some example embodiments, the systems, methods, and techniques described herein are performed on one or more computerized systems. Such computerized systems are able in various examples to perform the recited functions such as mapping known malware data sets, processing mapped known malware data sets to reduce redundant detections, and other such tasks by executing software instructions on a processor, and through use of associated hardware. FIG. 4 is one example of such a computerized malware server system. FIG. 4 illustrates only one particular example of computing device 400, and other computing devices 400 may be used in other embodiments. Although computing device 400 is shown as a standalone computing device, computing device 400 may be any component or system that includes one or more processors or another suitable computing environment for executing software instructions in other examples, and need not include all of the elements shown here.

As shown in the specific example of FIG. 4, computing device 400 includes one or more processors 402, memory 404, one or more input devices 406, one or more output devices 408, one or more communication modules 410, and one or more storage devices 412. Computing device 400 in one example further includes an operating system 416 executable by computing device 400. The operating system includes in various examples services such as a network service 418 and a virtual machine service 420 such as a virtual server or virtualized honeypot device. One or more applications, such as malware data set module 422 are also stored on storage device 412, and are executable by computing device 400.

Each of components 402, 404, 406, 408, 410, and 412 may be interconnected (physically, communicatively, and/or operatively) for inter-component communications, such as via one or more communications channels 414. In some examples, communication channels 414 include a system bus, network connection, inter-processor communication network, or any other channel for communicating data. Applications such as reference file set classification module 422 and operating system 416 may also communicate information with one another as well as with other components in computing device 400.

Processors 402, in one example, are configured to implement functionality and/or process instructions for execution within computing device 400. For example, processors 402 may be capable of processing instructions stored in storage device 412 or memory 404. Examples of processors 402 include any one or more of a microprocessor, a controller, a digital signal processor (DSP), an application specific integrated circuit (ASIC), a field-programmable gate array (FPGA), or similar discrete or integrated logic circuitry.

One or more storage devices 412 may be configured to store information within computing device 400 during operation. Storage device 412, in some examples, is known as a computer-readable storage medium. In some examples, storage device 412 comprises temporary memory, meaning that a primary purpose of storage device 412 is not long-term storage. Storage device 412 in some examples is a volatile memory, meaning that storage device 412 does not maintain stored contents when computing device 400 is turned off. In other examples, data is loaded from storage device 412 into memory 404 during operation. Examples of volatile memories include random access memories (RAM), dynamic random access memories (DRAM), static random access memories (SRAM), and other forms of volatile memories known in the art. In some examples, storage device 412 is used to store program instructions for execution by processors 402. Storage device 412 and memory 404, in various examples, are used by software or applications running on computing device 400 such as malware data set module 422 to temporarily store information during program execution.

Storage device 412, in some examples, includes one or more computer-readable storage media that may be configured to store larger amounts of information than volatile memory. Storage device 412 may further be configured for long-term storage of information. In some examples, storage devices 412 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication modules 410. Computing device 400 in one example uses communication module 410 to communicate with external devices via one or more networks, such as one or more wireless networks. Communication module 410 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 400 uses communication module 410 to communicate with an external device such as via public network 122 of FIG. 1.

Computing device 400 also includes in one example one or more input devices 406. Input device 406, in some examples, is configured to receive input from a user through tactile, audio, or video input. Examples of input device 406 include a touchscreen display, a mouse, a keyboard, a voice-responsive system, a video camera, a microphone, or any other type of device for detecting input from a user.

One or more output devices 408 may also be included in computing device 400. Output device 408, in some examples, is configured to provide output to a user using tactile, audio, or video stimuli. Output device 408, in one example, includes a display, a sound card, a video graphics adapter card, or any other type of device for converting a signal into an appropriate form understandable to humans or machines. Additional examples of output device 408 include a speaker, a light-emitting diode (LED) display, a liquid crystal display (LCD), or any other type of device that can generate output to a user.

Computing device 400 may include operating system 416. Operating system 416, in some examples, controls the operation of components of computing device 400, and provides an interface from various applications such as malware data set module 422 to components of computing device 400. For example, operating system 416, in one example, facilitates the communication of various applications such as malware data set module 422 with processors 402, communication unit 410, storage device 412, input device 406, and output device 408. Applications such as malware data set module 422 may include program instructions and/or data that are executable by computing device 400. As one example, malware data set module 422 uses malware data set engine 424 to process known malware data set 426 by mapping the known malware data set to symbols that conserve memory, and processing the mapped known malware data set to generate a processed malware data set 428 that has reduced redundancy in malware detections or signatures. These and other program instructions or modules may include instructions that cause computing device 400 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of reducing redundancy in a malware signature list, comprising:
   reading a plurality of pairs of records in the known malware signature list, each pair of records comprising a file identifier and an associated malware detection;
   mapping at least one of the file identifiers and the associated malware detections to symbols representing the at least one of the file identifiers and the associated malware detections, the symbols taking less memory than the at least one of the file identifiers and the associated malware detections;
   evaluating the mapped file identifiers for multiple detections of known malware represented in the file identifiers;
   processing the mapped symbols representing the at least one of the file identifiers and the associated malware detections to remove at least some malware detections from the processed known malware signature list that are not needed to provide a desired degree of representation of more than one of each file identifier in the processed known malware signature list, wherein the degree of representation of a known malware in the known malware signature list is determined by the number of redundant detections of the known malware; and
   storing a record of the processed known malware signature list.

2. The method of reducing redundancy in a malware signature list of claim 1, wherein the desired degree of representation of each file identifier comprises covering each file by at least one detection.

3. The method of reducing redundancy in a malware signature list of claim 2, wherein the desired degree of representation of each file identifier further comprises employing an algorithm to determine which of a plurality of detections covering a file should be retained.

4. The method of reducing redundancy in a malware signature list of claim 1, wherein the desired degree of representation of each file identifier is that each file be represented by at least a configurable number of malware detections before additional malware detections covering the file are removed.

5. The method of reducing redundancy in a malware signature list of claim 1, wherein the file identifier is a hash of the file.

6. The method of reducing redundancy in a malware signature list of claim 1, wherein the desired degree of representation of each file identifier comprises not removing detections that cover more than a threshold number of unique files.

7. The method of reducing redundancy in a malware signature list of claim 1, wherein the mapping at least one of the file identifiers and the associated malware detections occurs for each of the plurality of pairs of records before the processing the mapped symbols representing the at least one of the file identifiers and the associated malware detections to remove at least some malware detections.

8. The method of reducing redundancy in a malware signature list of claim 1, wherein the malware detection comprises a name of the malware in the associated file.

9. The method of reducing redundancy in a malware signature list of claim 1, wherein the symbols representing the at least one of the file identifiers and the associated malware detections comprise numbers.

10. The method of reducing redundancy in a malware signature list of claim 1, wherein the mapped symbols representing the at least one of the file identifiers and the associated malware detections are stored in nonvolatile storage.

11. The method of reducing redundancy in a malware signature list of claim 10, wherein the mapped symbols representing the at least one of the file identifiers and the associated malware detections stored in nonvolatile storage are read into memory in segments for the processing to remove at least some malware detections.

12. The method of reducing redundancy in a malware signature list of claim 1, further comprising creating and storing a map for the at least one of the mapped file identifiers and the associated malware detections.

13. The method of reducing redundancy in a malware signature list of claim 1, wherein mapping at least one of the file identifiers and the associated malware detections to symbols representing the at least one of the file identifiers and the associated malware detections comprises mapping the file identifiers to symbols representing the file identifiers and mapping the associated malware detections to symbols representing the associated malware detections.

14. A computerized system, comprising:
a processor;
a memory;
nonvolatile storage; and
instructions stored on the nonvolatile storage, the instructions operable when executed on the processor to cause the computerized system to:
- map a plurality of pairs of file identifiers and associated malware detections from a known malware signature list to symbols representing the file identifiers and symbols representing the associated malware detections, the symbols taking less memory than the file identifiers and the associated malware detections;
- evaluating the mapped file identifiers for multiple detections of known malware represented in the file identifiers; and
- process the mapped plurality of pairs to remove at least some malware detections from a processed known malware signature list that are not needed to provide a desired degree of representation of more than one of each file identifier in a processed known malware signature list, wherein the degree of representation of a known malware in the known malware signature list is determined by the number of redundant detections of the known malware.

15. The computerized system of claim 14, wherein the desired degree of representation of each file identifier is that one of a plurality of detections covering a file should be retained as selected by an algorithm.

16. The computerized system of claim 14, wherein the desired degree of representation of each file identifier is that each file be represented by at least a configurable number of malware detections before additional malware detections covering the file are removed.

17. The computerized system of claim 14, wherein the desired degree of representation of each file identifier comprises not removing detections that cover more than a threshold number of unique files.

18. A method of reducing redundancy in a malware signature list, comprising:
- mapping a plurality of pairs of file identifiers and associated malware detections from a known malware signature list to symbols representing the file identifiers and symbols representing the associated malware detections, the symbols taking less memory than the file identifiers and the associated malware detections;
- evaluating the mapped file identifiers for multiple detections of known malware represented in the file identifiers; and
- processing the mapped plurality of pairs to remove at least some malware detections from a processed known malware signature list that are not needed to provide a desired degree of representation of each file identifier in the processed known malware signature list, wherein the degree of representation of a known malware in the known malware signature list is determined by the number of redundant detections of the known malware.

* * * * *